(12) United States Patent
Miller et al.

(10) Patent No.: US 7,662,334 B2
(45) Date of Patent: Feb. 16, 2010

(54) VACUUM HEAT-SET OF NET SHAPE LATEX VACUUM BAGS

(75) Inventors: Finley B. Miller, Huntington Beach, CA (US); Steven P. DeCoux, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 12/040,611

(22) Filed: Feb. 29, 2008

(65) Prior Publication Data

US 2009/0218713 A1 Sep. 3, 2009

(51) Int. Cl.
*B29C 51/00* (2006.01)

(52) U.S. Cl. .................. 264/552; 264/553; 264/571; 264/301

(58) Field of Classification Search .................. 264/101, 264/112, 552, 553, 571, 301, 500, 544, 239, 264/299; 156/60
See application file for complete search history.

(56) References Cited

U.S. PATENT DOCUMENTS

| | | | | |
|---|---|---|---|---|
| 5,035,849 A * | 7/1991 | Uemura et al. | ............... | 264/255 |
| 6,465,591 B1 * | 10/2002 | Lee | ............................. | 526/264 |
| 6,764,754 B1 * | 7/2004 | Hunter et al. | ............ | 428/301.4 |
| 7,147,818 B1 * | 12/2006 | Rigas et al. | .................. | 264/510 |
| 2002/0022422 A1 * | 2/2002 | Waldrop et al. | ............. | 442/179 |
| 2006/0022380 A1 * | 2/2006 | Audette | ...................... | 264/257 |
| 2006/0276087 A1 * | 12/2006 | Conner, Jr. | .................... | 441/74 |
| 2007/0243393 A1 * | 10/2007 | Vaidyanathan et al. | ...... | 428/446 |
| 2008/0106007 A1 * | 5/2008 | Kipp et al. | .................. | 264/571 |
| 2008/0211130 A1 * | 9/2008 | Rydin et al. | ................ | 264/102 |

* cited by examiner

*Primary Examiner*—Khanh Nguyen
*Assistant Examiner*—Saeed M Huda
(74) *Attorney, Agent, or Firm*—Rozenblat IP LLC (57) ABSTRACT

A net shaped latex vacuum bag as used in the fabrication of composite structural parts having complex shapes. Liquid latex is first allowed to air dry in the form of a thin flat, flexible sheet. The latex sheet is then vacuum formed over a tool having the complex shape of the part to be fabricated and assumes the shape and configuration of the tool's outer surface. The latex sheet is then rapidly cured at an elevated temperature, so as to permanently assume the part's shape for subsequent use in forming composite structural parts of the same complex shape. In one embodiment, the latex sheet may be formed on the tool by dipping the tool in liquid latex, allowing the latex coating to dry, and cutting the dry latex coating to permit separation of the tool from the latex coating which is then used in composite part fabrication.

25 Claims, 8 Drawing Sheets

VACUUM HEAT-SET OF NET SHAPE LATEX VACUUM BAGS

TECHNICAL FIELD

This disclosure relates generally to the fabrication of composite structures and is particularly directed to the use of latex vacuum bags in the fabrication of composite parts having complex shapes.

BACKGROUND

Composite parts having complex shapes may be formed using vacuum bags comprised of pleated nylon film which may be configured to conform to the shape of the preform. The preform may be preimpregnated (prepreg) or a dry material with resin infused during consolidation. Vacuum is drawn on the vacuum bag in part to debulk the preform. These complex shapes typically include highly contoured or compound contoured surfaces or those with integral shaped details such as without limitation stringers or frames. Current approaches to fabricating composite parts with complex shapes may suffer from several limitations. For example, installing a pleated nylon vacuum bag over a preform may be extremely labor intensive, requiring highly skilled technicians to apply the intricate pleating patterns necessary to avoid bridging of a bag. Bridging may result in a localized reduced vacuum, which may result in resin pooling. In addition, the thin nylon bags may be susceptible to puncture-related leaks, which may occur during nylon bag installation. The nylon bag pleats may pinch off and render leaks more difficult to detect. When a leak is pinched off, the flow of air through the leak is restricted, making a leak harder to identify in a leak check and harder to locate once a leak is known to exist.

One attempt to avoid the leak susceptibility and labor intensive nature of pleated nylon bag installation in the fabrication of composite parts involves the dipping of a metal mandrel into latex, followed by oven curing of the latex on the mandrel. The latex bags thus formed using this approach may also suffer from several limitations. More specifically, the latex used in forming vacuum bags in this manner may shrink nonuniformly as it cures depending upon physical constraints inherent in the complex shape of the part. This limits the extent of conformance of the thus formed latex bag to the outer surface of the metal mandrel representing the composite part to be fabricated. Silicone bags have also been used, but they may be expensive to manufacture and present a clean room contamination problem. Accordingly, there is a need for a vacuum bag which overcomes the aforementioned limitations.

SUMMARY

The embodiments of the disclosure avoid the aforementioned limitations of the prior art by providing for the vacuum heat-set of net shape latex vacuum bags used in the fabrication of composite parts having complex shapes. An uncured, flat, flexible latex sheet is placed over the surface of a tool having the shape of a part to be fabricated and a vacuum is applied between the latex sheet and the tool so as to tightly draw the latex sheet to the tool's surface. Alternatively, a dipping tool is dipped into liquid latex and a latex layer is formed on, and in the shape of, the tool and a vacuum is applied between the latex layer and the tool so as to tightly draw the latex sheet to the tool's surface. In both embodiments, the thus formed latex body closely conforming to the tool's outer surface is then cured so as to form a vacuum bag adapted to receive a preform of composite fabric layers as part of consolidating and curing a part into the desired shape.

The embodiments of the disclosure involve the vacuum heat-set formation of latex bags useful in the formation of composite structures having complex shapes. The low cost of latex and its high stretch characteristics, together with its ability to assume highly complex and irregular shapes, makes it particularly adapted for the curing of carbon fiber/epoxy composite material parts having intricate configurations. The latex bags may easily conform to the desired shape and, once cured, remain in the desired shape for possible repeated use in the fabrication of composite parts. The use of latex eliminates the need for pleats in prior art nylon bags which may be difficult to work with and prone to vacuum leaks. In accordance with the disclosure, an uncured, flat, flexible latex sheet may be placed over the surface of a mold tool having substantially the shape as the composite part to be fabricated. A vacuum is then applied between the latex sheet and the surface of the tool to draw the latex sheet to the surface of the tool. The thus shaped latex sheet is then cured such as by heating so as to form a fixed body in the shape of the surface of the tool for use in fabricating a part. Latex has also been found to stretch to all corners of the composite part being fabricated for more precise and accurate part reproduction and also maintains the shape of the part after vacuum is removed.

BRIEF DESCRIPTION OF THE DRAWINGS

The appended claims set forth those novel features. However, the embodiments of the disclosure, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION

Figure 1:
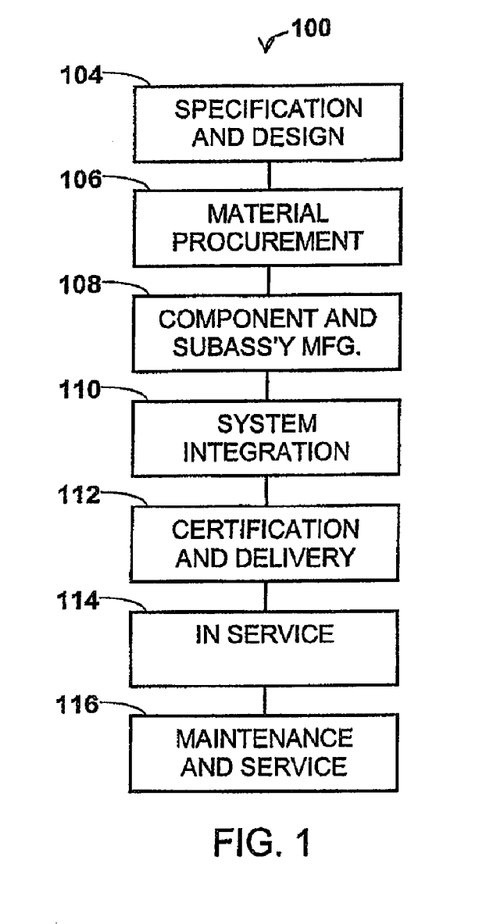
FIG. 1. is a flow diagram of aircraft production and service methodology.
Figure 2:
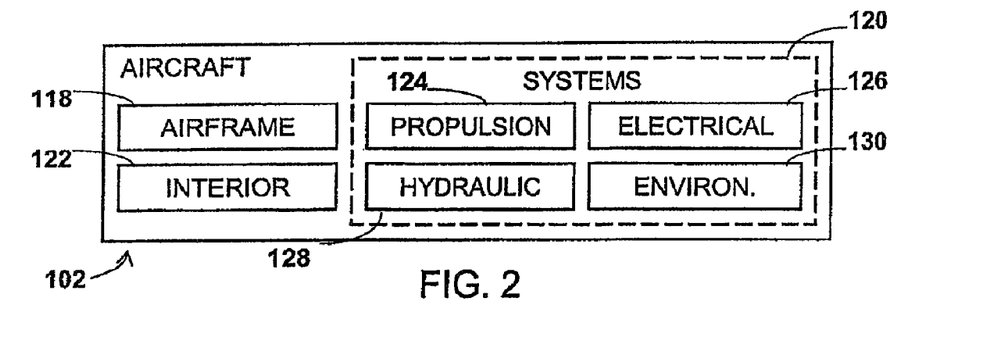
FIG. 2. is a block diagram of an aircraft.

Referring more particularly to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 3:
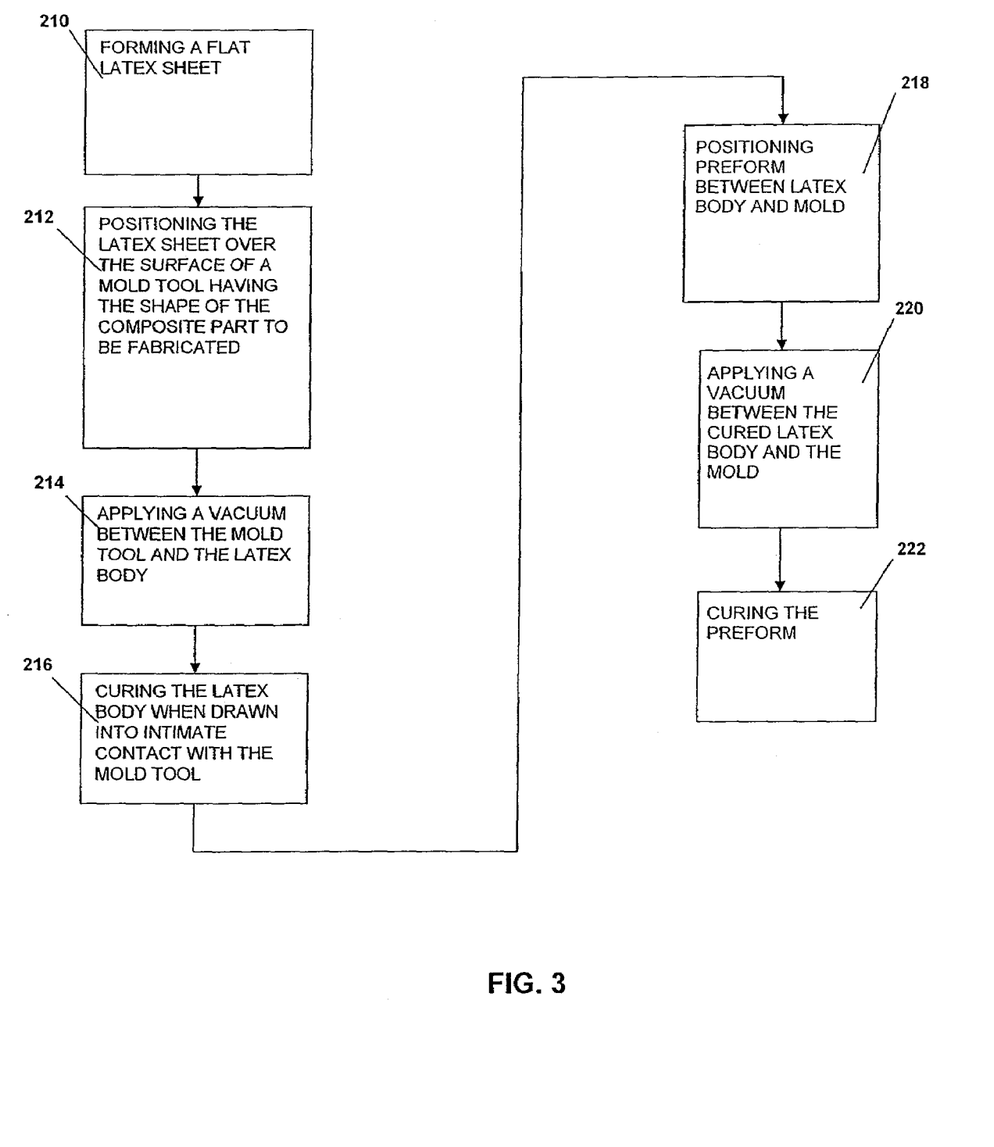
FIG. 3. is a simplified flow chart illustrating the series of steps carried out in accordance with one embodiment of the present disclosure.

Referring to FIG. 3, there is shown a flow chart illustrating the series of steps carried out in accordance with a preferred embodiment of the disclosure.

The process starts at step 210 with the formation of a flat latex sheet such as by pouring liquid latex onto a non-adherent flat surface and allowing the liquid latex to set by air drying. The latex may set in the form of a thin, flat, flexible sheet capable of substantial increase by stretching in its length and width dimensions. A surface coating may be applied to the latex sheet to render it impermeable to air flow particularly at high curing temperatures. The latex sheet, or plural latex sheets arranged in an edge-overlapping manner, are then positioned at step 212 over the outer surface of a mold, or setting, tool having the shape of the composite part to be fabricated. The latex sheet, or sheets, are preferably positioned over the entire outer surface of the mold tool. The mold tool is preferably comprised without limitation of aluminum, steel or composites. The mold tool may be shaped to precisely conform to the outer surface of the composite part to be fabricated by conventional means such as without limitation grinding and polishing. A breather layer is positioned between the mold tool and the latex sheet. The breather layer may be comprised without limitation a dry fiberglass material or a cotton material through which air can flow. The latex sheet is, of course, impervious to the flow of air.

With the breather layer disposed on the outer surface of the release layer, and the latex sheet disposed on the outer surface of the breather layer, the space between the mold tool and the latex sheet is evacuated at step 214 by conventional means such as a vacuum pump with appropriate connections to the space between the mold tool and the latex sheet. Applying a vacuum between the mold tool and the latex sheet causes the latex sheet to be drawn toward the outer surface of the mold tool and to closely assume the shape and configuration of the mold tool. The breather layer allows an air flow channel to permit the latex sheet to closely assume the shape of the mold tool's outer surface. The combination of the mold tool, the breather layer, and the latex sheet may then be placed in an oven at step 216 for high temperature curing of the latex sheet. The latex sheet formed in the shape of the mold tool's outer surface may also be referred to as the "green" latex sheet prior to its curing at high temperatures. The cured latex sheet is converted to the form of a hollow latex body enclosing the mold tool and the breather layer. The cured latex body is removed from the mold tool and breather layer.

At step 218, a lay-up of composite fiber layers in the general form of the part to be fabricated is positioned within and in contact with the cured latex body. The lay-up composite item may be comprised of an uncured combination of carbon fiber and epoxy material, also called a preform, in the general form of the part to be fabricated. Once positioned in contact with the latex body at step 218, a vacuum is applied between the cured latex body and the mold at step 220. This debalks and compresses the prepreg composite layers (perform) onto the mold and into the desired shape of the part to be fabricated. The lay-up of composite fiber layers is then cured at an elevated temperature while disposed within and in contact with the cured latex body at step 222. Curing of the lay-up of composite fiber layers may result in the formation of a substantially rigid, high strength composite body having the desired shape of the fabricated part.

Figure 4:
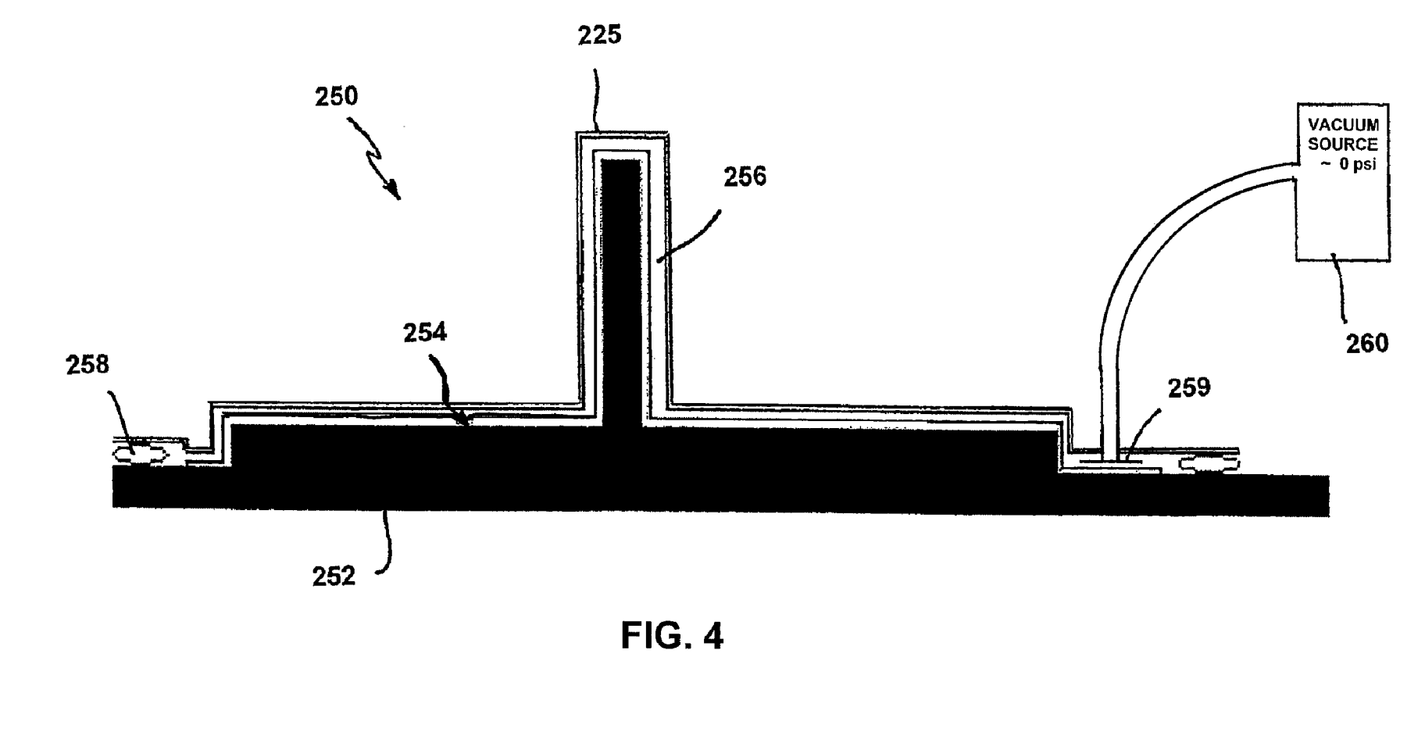
FIG. 4. is a simplified sectional view of a mold-forming arrangement for carrying out the vacuum heat-setting of net-shape latex vacuum bags illustrated in FIG. 3.

Referring to FIG. 4, conforming with steps 210 through step 216, there is shown a simplified sectional view of a first mold-forming arrangement 250 for carrying out the method described above. First mold-forming arrangement 250 includes a mold tool 252 in substantially the shape and configuration of at least one side of the composite part being formed. Mold tool 252 is shown in the general shape of an upside-down "T" in FIG. 4, although the mold-forming arrangement 250 is not limited to forming a mold in this shape, but rather is capable of forming a mold in virtually any shape and configuration. Disposed on the upper outer surface of mold tool 252 is a breather layer 254 through which air can pass. Disposed on the breather layer 254 is a cured latex body or latex sheet 256 which is impervious to the flow of air. Latex sheet 256 preferably has applied to one of its surfaces a coating 225 comprised of an air impermeable material such as without limitation butyl rubber which can be applied by spraying. Disposed between the mold tool 252 and latex sheet 256 about the periphery of these elements is a seal, or sealant, 258. A vacuum source 260 may be connected to the latex sheet 256 by means of a seal 259. Vacuum source 260 is preferably capable of drawing a vacuum approaching about 0 psi, with atmospheric pressure being on the order of about 14.7 psi. First mold-forming arrangement 250 maintains the outer latex sheet 256 in near contact with the outer surface of mold tool 252 by means of the combination of breather layer 254 and vacuum source 260. With the latex sheet 256 formed in substantially the shape and configuration of the outer surface of mold tool 252, the combination of the latex sheet 256, breather layer 254 and mold tool 252 may then be heated in an oven, or by other means, for an extended period of time so as to effect curing of the latex sheet 256. The latex sheet 256 is then removed from the mold tool 252, whereupon it substantially retains the shape of the outer surface of the mold tool for use in forming composite parts in the shape and configuration described. The latex sheet 256 is now a vacuum bag shaped substantially as a counterpart for at least a portion of the mold tool 252.

Figure 5:
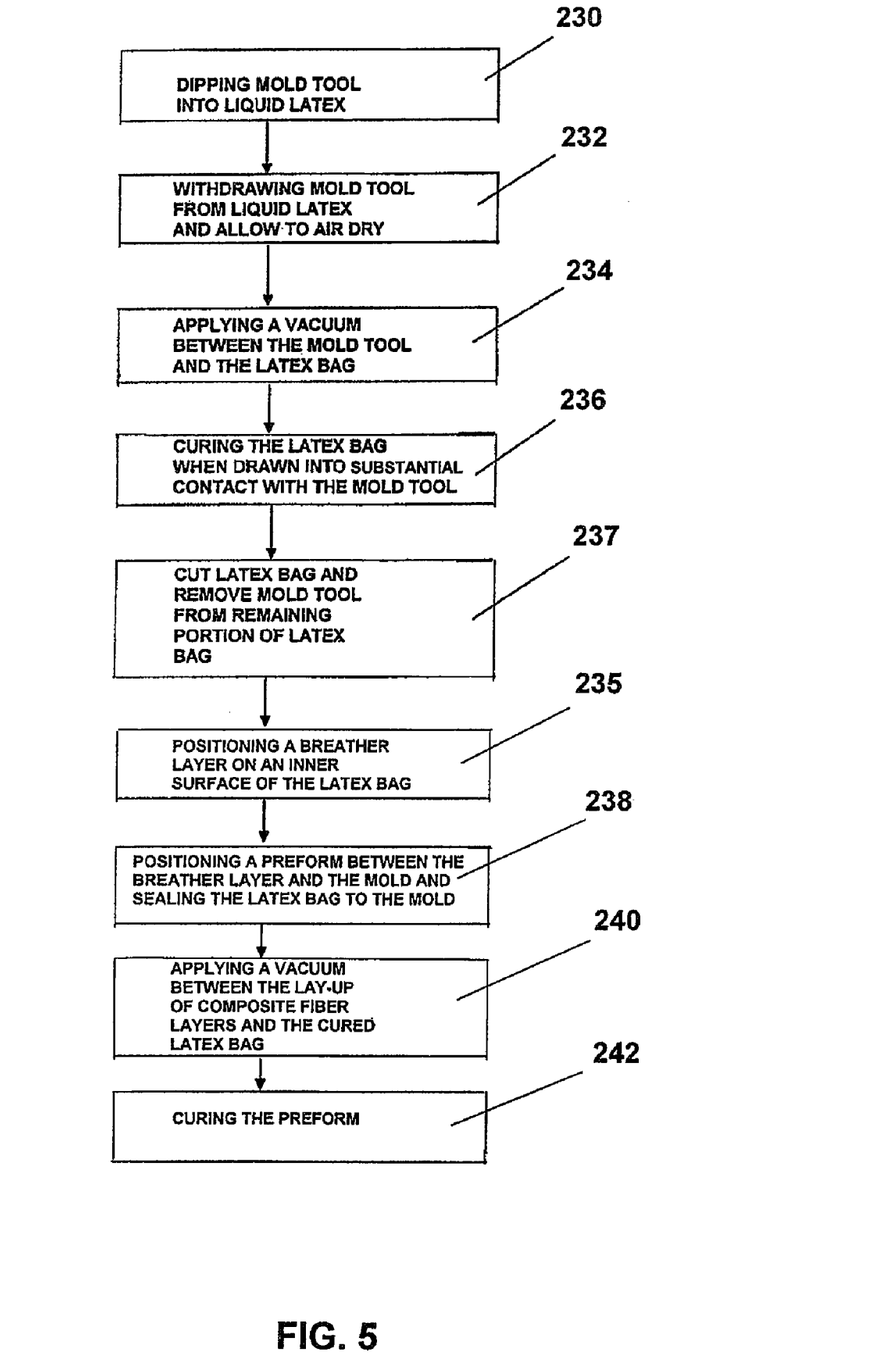
FIG. 5. is a simplified flow chart illustrating the series of steps carried out in accordance with another embodiment of the present disclosure.

For complex part geometries, the method described above is preferably modified as shown in FIG. 5. The embodiment of the disclosure illustrated in FIG. 5 is initiated at step 230 with the dipping of a mold tool into liquid latex. The mold tool disposed in the liquid latex is then withdrawn from the liquid latex and is allowed to air dry at room temperature so as to form a "green" latex bag as shown at step 232. The latex bag disposed about the mold tool shrinks as it dries so as to more closely assume an intricate outer surface of a complex composite part. A vacuum is applied between the mold tool and the latex sheet at step 234 causing the latex sheet to be drawn toward and to be positioned in substantial contact with the outer surface of the mold tool so as to closely assume the shape and configuration of the mold tool. The combination of the mold tool and the latex sheet is then placed in an oven, or otherwise heated, at step 236 for high temperature curing of the latex sheet. At step 237, the latex bag is then cut to allow for the removal of the mold tool from the latex bag. At step 235 a breather layer is positioned on an inner surface of the latex bag. At step 238, a lay-up of preimpregnated composite fiber layers (preform) in the general form of the part to be fabricated is positioned between the breather layer and the mold so as to seal the latex bag to the mold. Once the latex bag, breather layer and lay-up of composite fiber layers are arranged in a layered configuration at step 238, a vacuum is applied between the mold and the cured latex bag at step 240 to draw the latex bag into substantial contact with the composite fiber lay-up to debalk the preform until shaped as desired. The lay-up of composite fiber layers is then cured at step 242 at an elevated temperature while disposed in near contact with the cured latex bag.

Figure 6:
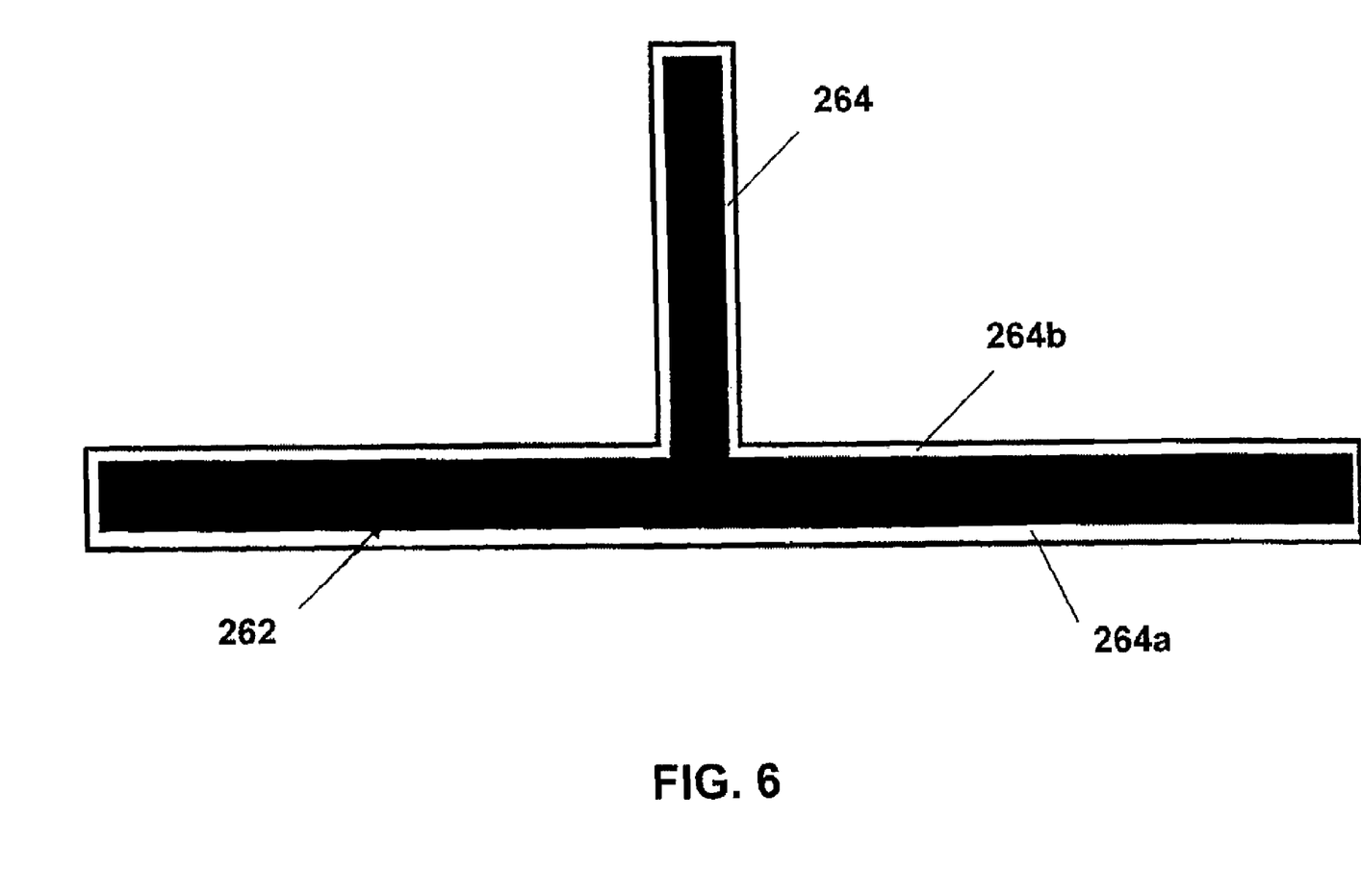
FIG. 6. is a simplified sectional view of a mold tool having an outer latex layer formed thereon used in initiating the method shown in FIG. 5.

Referring to FIG. 6, there is shown a mold, or dipping, tool 262 having an outer latex layer 264 formed thereon by dipping the mold tool into liquid latex in accordance with steps 230, 232, 234, 236 and 237 of the method illustrated in FIG. 5. Mold tool 262 is entirely encapsulated within the outer latex layer 264 and is allowed to air dry. As the outer latex layer 264 air dries, portions of the outer latex layer 264 may shrink away from mold tool 262 depending upon the configuration of the mold tool's outer surface. Thus, as shown in FIG. 7, first and second portions 266a and 266b of outer latex layer 264 may have shrunk away from 90° surface portions of mold, or dipping, tool 262.

Figure 7:
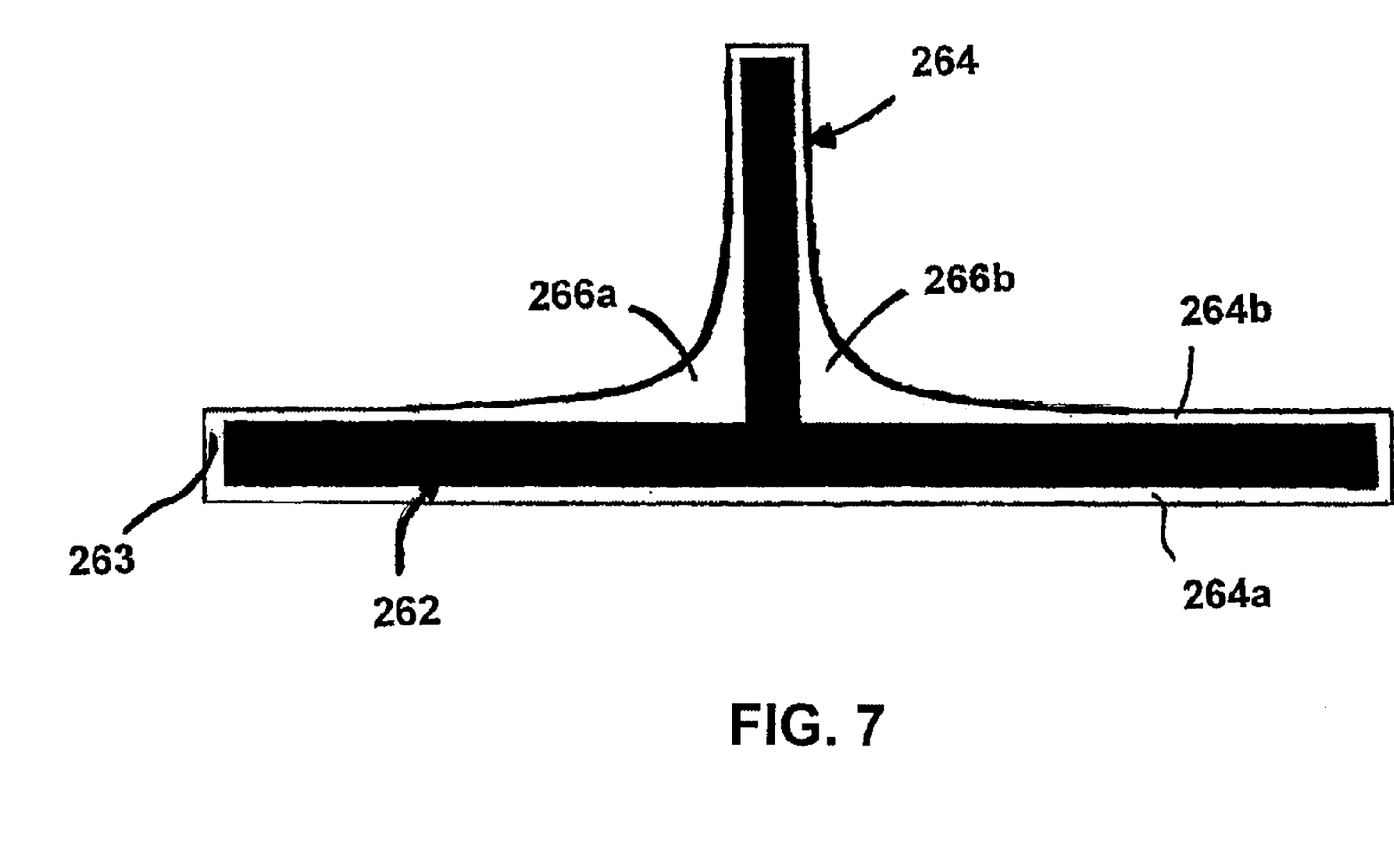
FIG. 7. is a simplified sectional view of a mold tool having an outer latex layer illustrating the shrinking of the latex layer from portions of the surface of the mold tool and a cut line in the outer latex surface for removing the mold tool from the latex layer.

After the latex covered mold tool 262 is allowed to air dry, a cut line 263 is formed in the outer latex layer 264 about the mold tool as shown in FIG. 7. Cut line 263 allows the lower portion 264a of the outer latex layer 264 to be separated from its upper portion 264b. Separation of the outer latex layer's lower portion 264a from its upper portion 264b allows mold tool 262 to be removed from the outer latex layer 264.

Figure 8:
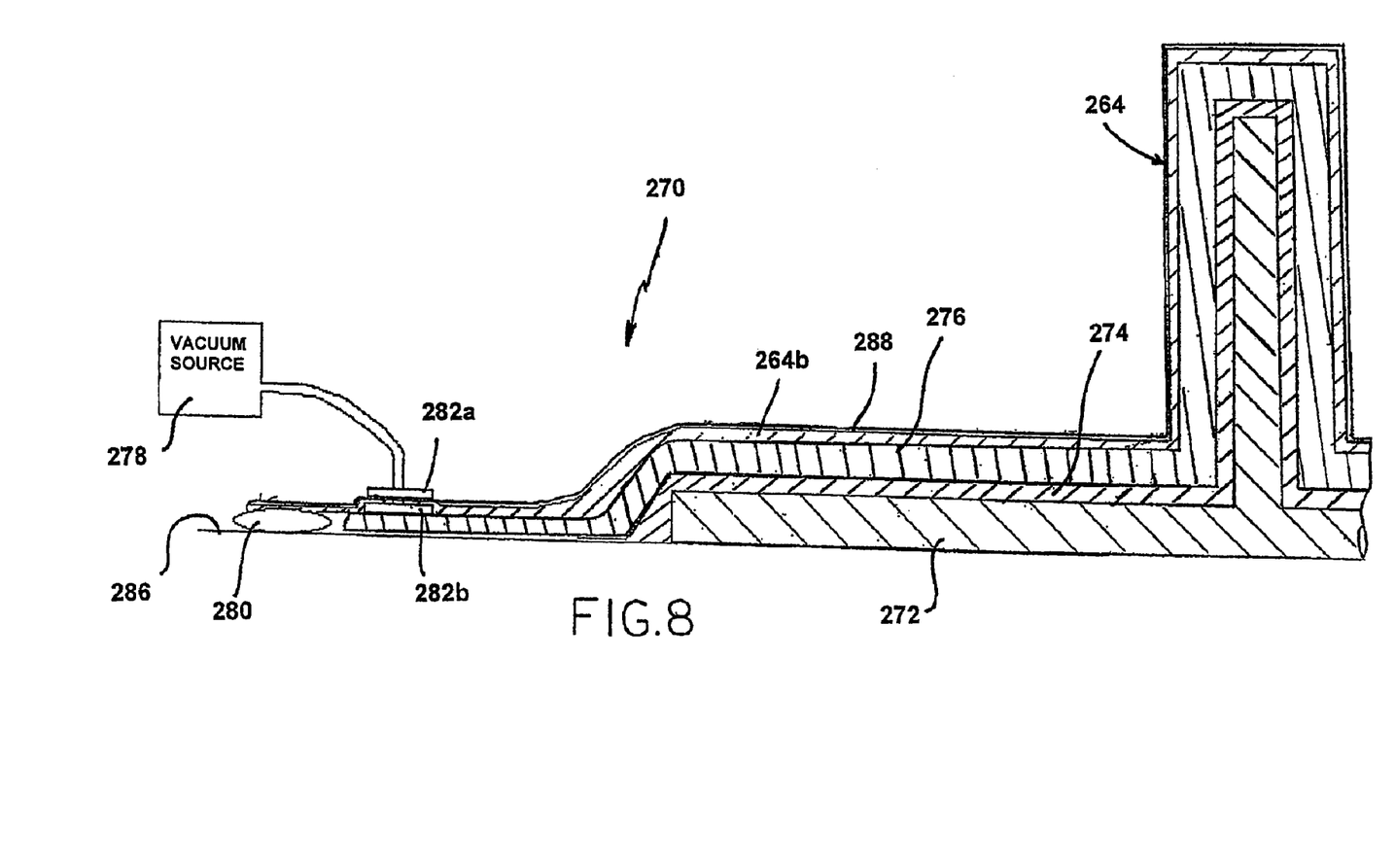
FIG. 8. is a partial simplified sectional view of a mold-forming arrangement for use in carrying out the vacuum heat-setting of net shape latex vacuum bags method illustrated in FIG. 5.

Referring to FIG. 8, approximately corresponding to steps 235, 238, 240 and 242, there is shown a simplified partial sectional view of a second mold-forming arrangement 270 for completing the method shown in FIG. 5. The second mold-forming arrangement 270 makes use of the thus-formed upper portion 264b of the outer latex layer for more precisely bagging the surface of a composite part 272 in the desired shape and configuration in accordance with another embodiment of the disclosure. Positioned on the upper and/or, outer surface of perform or composite part 272 is a release layer 274 which facilitates removal of the second mold-forming arrangement 270 from the composite part after the composite part is cured in accordance with a specified shape and configuration. Disposed in contact with the release layer 274 is a breather layer 276 which allows for the passage of air therethrough for distributing a vacuum between outer latex layer 264 and support surface 286. Disposed in contact with breather layer 276 is the upper portion 264b of outer latex layer previously described. Preferably applied to a surface of the upper portion 264b of the outer latex layer is an air impermeable coating 288 as previously described. The second mold-forming arrangement 270 further includes a seal, or sealant, 280 disposed adjacent to and in contact with the peripheral portion of the latex layer's upper portion 264b and a support surface 286. Attached to the upper portion 264b of the outer latex layer by means of first and second seals 282a and 282b is a vacuum source 278. Other attachment locations are within the contemplation of those skilled in the art. When a vacuum is applied by vacuum source 278 the latex layer's upper portion 264b is drawn down towards the outer surface of the composite part 272 may form a caul or have a caul effect to aid in configuring and shaping the outer surface of the composite part. Composite part 272 is in its uncured lay-up form or perform state, wherein it is capable of deformation to allow it to be configured and shaped in accordance with the composite part specification.

Figure 9:
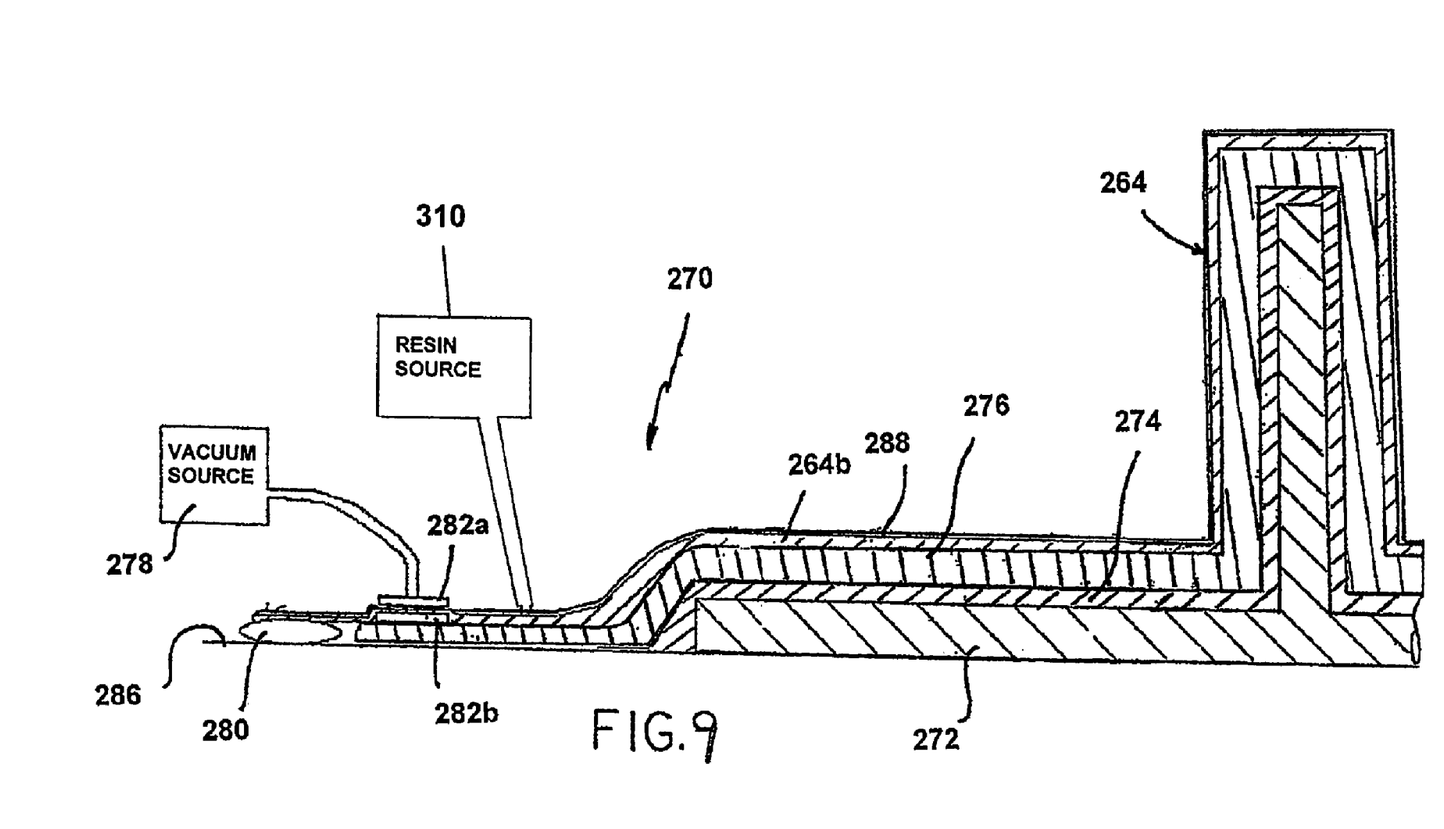
FIG. 9. includes the sectional view of FIG. 8 and which also illustrates a resin source for infusing resin in the preform.

While FIG. 8 shows a preform 272 fabricated from preimpregnated reinforced materials, it is within the contemplation of those skilled in the art to form the preform 272 from dry reinforcement material and infuse resin into the preform prior to curing. A resin source 310 may be added to the configuration as shown in FIG. 9. The resin source 310 may be connected to the upper portion 264b. The resin may be infused after the preform is debulked and while still under vacuum. Resin may be infused into the perform until the perform is impregnated. Infusion from resin source 310 may then be stopped and the perform may be cured per step 242. The step of resin infusion may occur between step 240 and step 242 in FIG. 5. Similarly, resin infusion of the perform 272 may occur between step 220 and step 222 of FIG. 3.

The dry reinforcement material of the preform 272 may be tacked together by any suitable material which does not restrict resin infusion. Tacking the preform 272 together prior to placing under the breather layer may allow an operator to create a more complex shape than otherwise possible without tacking.

While particular embodiments of the disclosure have been shown and described, it will be obvious to those skilled in the relevant arts that changes and modifications may be made without departing from the broader aspects of the embodiments. Moreover, conventional processes which form a part of the disclosure and which are well known to those skilled in the relevant arts are not discussed in detail herein. For example, the formation of a vacuum between the latex sheet and mold tool as well as between an outer flexible bag and a mold or support surface surrounding a composite material for forming the inner composite body in a given shape is well known to those skilled in the relevant arts and is not discussed in detail herein. Therefore, the aim in the appended claims is to cover all such conventional details and changes and modifications as fall within the true spirit and scope of the disclosure. The matter set forth in the foregoing description and accompanying drawing is offered by way of illustration only and not as a limitation. The actual scope of the disclosure is intended to be defined in the following claims when viewed in their proper perspective based on the prior art.

The invention claimed is:

1. A method for forming a vacuum bag for use in fabricating a composite part, said method comprising the steps of:
   providing a tool having a shape of the part;
   positioning an uncured latex sheet over at least a part of said tool;
   applying a vacuum between said latex sheet and a surface of said tool to draw said latex sheet into substantial contact with said tool; and
   curing said latex sheet, while the vacuum is being applied between said latex sheet and the surface of said tool, so that said latex sheet becomes the vacuum bag retaining a shape of at least a part of said tool surface over which the latex sheet was positioned.

2. The method of claim 1 further comprising the step of positioning a breather layer between said latex sheet and said tool to facilitate formation of a vacuum therebetween.

3. The method of claim 1 further comprising the step of applying an air-impermeable coating to said latex sheet.

4. The method of claim 1 wherein the step of positioning said uncured latex sheet over at least part of said tool includes depositing liquid latex on said tool and allowing said liquid latex to set.

5. The method of claim 4 further comprising the step of allowing said uncured latex sheet to air dry following depositing of said liquid latex on said tool.

6. The method of claim 2 wherein the breather layer comprises a composition of fiberglass or cotton material.

7. The method of claim 3 wherein the step of applying the air-impermeable coating includes spraying a butyl rubber composition on said latex sheet.

8. The method of claim 1 wherein said vacuum is applied at least until said vacuum bag is cured.

9. The method of claim 1 wherein said composite part is an aircraft component.

10. The method of claim 1 wherein the step of positioning the uncured latex sheet over at least part of said tool includes dipping said tool into liquid latex and removing said tool from said liquid latex.

11. A method for forming a composite part having a specified shape comprising the steps of:
   providing a tool having a shape of the part;
   positioning an uncured latex sheet over at least a part of said tool;
   applying a vacuum between said uncured latex sheet and a surface of said tool to draw said uncured latex sheet into substantial contact with said tool;
   curing said latex sheet, while the vacuum is being applied between said latex sheet and the surface of said tool, so that said latex sheet becomes a latex body retaining a shape of the surface of the at least the part of said tool over which the latex sheet was positioned;
   providing a lay-up of composite fiber layers in the general form of the composite part to be fabricated;
   positioning said lay-up of composite fiber layers between said latex body and said tool;
   applying a vacuum between said latex body and said tool for tightly drawing a surface of said latex body towards an outer surface of said lay-up of composite fiber layers; and
   curing said lay-up of composite fiber layers, while the vacuum is being applied between said latex body and said tool, so that said lay-up of composite fiber layers becomes the composite part having the specified shape.

12. The method of claim 11 wherein the tool comprises a rigid, hard metallic or composite in the specified shape of the part.

13. The method of claim 11 wherein the lay-up of composite fiber layers is preimpreginated.

14. The method of claim 11 wherein the lay-up of composite fiber layers is infused with resin after applying the vacuum.

15. The method of claim 11 wherein the step of positioning said uncured latex sheet over at least the part of said tool comprises depositing liquid latex on said tool and allowing said liquid latex to set in a form of a layer.

16. The method of claim 11 further comprising the step of positioning a first breather layer between said uncured latex sheet and said tool.

17. The method of claim 16 further comprising the step of positioning a second breather layer between said latex body and said lay-up of composite fiber layers.

18. The method of claim 17 further comprising the step of positioning a release layer between said second breather layer and said lay-up of composite fiber layers to facilitate removal of said latex body from said lay-up of composite fiber layers.

19. The method of claim 11 further comprising the step of applying an air-impermeable coating to said latex sheet.

20. The method of claim 11 wherein the step of positioning the uncured latex sheet over at least part of said tool comprises dipping said tool into liquid latex and removing the dipped tool from the liquid latex.

21. The method of claim 11 further comprising the step of allowing said uncured latex sheet to air dry following positioning of said uncured latex sheet over the at least the part of said tool.

22. The method of claim 19 wherein the step of applying the air-impermeable coating includes spraying a butyl rubber composition on said latex sheet.

23. The method of claim 11 wherein said composite part is an aircraft component.

24. A method for forming a composite part having a specified complex shape comprising the steps of:
   providing a rigid, hard metallic or composite tool having a shape of the part;
   positioning a first air-passing breather layer comprised of dry fiberglass or cotton material on a surface of said tool;
   depositing liquid latex on said first breather layer and allowing said liquid latex to set in the form of a thin sheet;
   applying an air-impermeable coating to a surface of said latex sheet;
   applying a first vacuum to said first breather layer so as to form a vacuum between said latex sheet and the surface of said tool for tightly drawing said latex sheet toward the surface of said tool;
   curing said latex sheet, whereupon said latex sheet forms a fixed body in the shape of the surface of said tool;
   removing said tool from said fixed latex body;
   positioning a release layer on a surface of a lay-up of composite fiber layers;
   positioning a second air-passing breather layer comprised of dry fiberglass or cotton material on said release layer;
   positioning said fixed latex body in contact with said second air-passing breather layer on said lay-up of composite fiber layers;
   applying a second vacuum to said second air-passing breather layer so as to form a vacuum between said fixed latex body and said lay-up of composite fiber layers for tightly drawing the surface of said fixed latex body toward the outer surface of said lay-up of composite fiber layers; and curing said composite fiber layers in forming a fixed composite part having a complex shape.

25. A method for forming a vacuum bag for use in fabricating a composite part, said method comprising the steps of:
providing a tool having a shape of the part;
dipping the tool into liquid latex;
removing the tool from the liquid latex so that a latex film is covering the tool;
allowing the latex film to dry on the tool so that the latex film is in a partially cured state;
applying a vacuum between the partially cured latex film and the tool to draw said partially cured latex film into substantial contact with said tool; and
curing the latex film at an elevated temperature, while the vacuum is being applied between the latex film and the tool, so that the latex film becomes the vacuum bag retaining the shape of the tool.

* * * * *